United States Patent
Van Der Walt

(10) Patent No.: US 8,179,007 B2
(45) Date of Patent: May 15, 2012

(54) GIMBAL

(76) Inventor: Carel Van Der Walt, London (GB)

( * ) Notice: Subject to any disclaimer, the term of this patent is extended or adjusted under 35 U.S.C. 154(b) by 60 days.

(21) Appl. No.: 12/304,115

(22) PCT Filed: Jun. 19, 2007

(86) PCT No.: PCT/GB2007/002277
§ 371 (c)(1),
(2), (4) Date: Nov. 18, 2009

(87) PCT Pub. No.: WO2007/148068
PCT Pub. Date: Dec. 27, 2007

(65) Prior Publication Data
US 2010/0231061 A1    Sep. 16, 2010

(30) Foreign Application Priority Data

Jun. 19, 2006  (GB) .................................. 0612110.7

(51) Int. Cl.
*H02K 7/09* (2006.01)
*H02K 57/00* (2006.01)
*F16M 11/14* (2006.01)
*F16C 32/04* (2006.01)

(52) U.S. Cl. ..................................................... 310/90.5

(58) Field of Classification Search ............... 310/28, 310/90.5; 623/24
See application file for complete search history.

(56) References Cited

U.S. PATENT DOCUMENTS 3,845,995 A * 11/1974 Wehde .......................... 310/90.5
4,719,381 A *  1/1988 Miles ............................ 310/166
(Continued)

FOREIGN PATENT DOCUMENTS

GB           1025325 A     4/1966
(Continued)

OTHER PUBLICATIONS

The International Search Report corresponding to PCT Application No. PCT/GB2007/002277 dated Sep. 28, 2007.
The GB Search Report corresponding to Priority Application No. GB0612110.7 dated Oct. 12, 2006.

*Primary Examiner* — Burton Mullins
(74) *Attorney, Agent, or Firm* — Knobbe Martens Olson & Bear LLP

(57) ABSTRACT

A gimbal arrangement comprises a socket (6) having a partially spherical inner surface with a first radius; a ball (2) located within the socket and having a partially spherical outer surface with a second radius smaller than the first radius; a first array of electromagnets (5) mounted at the outer surface of the ball; a second array of electromagnets (7) mounted at the inner surface of the socket (6); and means for supplying power selectively to different ones of the electromagnets of the two arrays to support the ball within the socket in a position where the partially spherical surfaces of the ball and socket are substantially concentric about a common center and to control the orientation of the ball relative to the socket.

6 Claims, 3 Drawing Sheets

U.S. PATENT DOCUMENTS

| | | | | |
|---|---|---|---|---|
| 4,785,212 A | * | 11/1988 | Downer et al. | 310/90.5 |
| 4,874,998 A | * | 10/1989 | Hollis, Jr. | 318/568.21 |
| 5,280,225 A | * | 1/1994 | Pine et al. | 318/575 |
| 5,413,010 A | | 5/1995 | Nakanishi et al. | |
| 5,476,018 A | * | 12/1995 | Nakanishi et al. | 74/5.7 |
| 5,959,806 A | | 9/1999 | Leung | |
| 6,803,738 B2 | * | 10/2004 | Erten | 318/653 |
| 6,906,441 B2 | * | 6/2005 | Mendenhall | 310/112 |
| 6,909,205 B2 | * | 6/2005 | Corcoran et al. | 310/12.14 |
| 7,710,337 B2 | * | 5/2010 | Blalock | 343/757 |

FOREIGN PATENT DOCUMENTS

| | | |
|---|---|---|
| GB | 2 344 173 A | 5/2000 |
| JP | 02 236019 A | 9/1990 |
| JP | 05-064417 | 3/1993 |
| JP | 080272446 A | 10/1996 |
| JP | 090006435 A | 1/1997 |

* cited by examiner

GIMBAL

RELATED APPLICATIONS

This application is the U.S. National Phase filing under 35 U.S.C. §371 of PCT/GB2007/002277, filed Jun. 19, 2007, which designated the United States and was published in English, which claims priority under 35 U.S.C. §119(a)-(d) to Great Britain Patent Application No. 0612110.7, filed Jun. 19, 2006. The contents of these applications is incorporated herein by reference in their entireties.

FIELD OF THE INVENTION

This invention relates to an improved gimbal design, and in particular to an improved gimbal for mounting an optical sensor such as a camera.

BACKGROUND OF THE INVENTION

In order to allow a sensor to be rotated independently about two orthogonal axes, known gimbal designs are based on the general approach of having two concentric stages or cages each mounted on a separate set of bearings and actuators to control rotation about one axis, with the inner stage mounted on the outer stage to allow the sensor to rotate independently about the two orthogonal axes. Similarly, in order to allow a sensor to be rotated independently about three orthogonal axes, three stages are used, mounted successively on one another.

There are a number of problems with this approach. The large number of components makes known gimbal arrangements unreliable, expensive and complex to assemble. Further, the large number of components makes it difficult to scale down the gimbal for small sensors.

The present invention was made in attempt to overcome these problems, at least in part.

SUMMARY OF THE INVENTION

In a first aspect, the invention provides a gimbal arrangement comprising:
- a socket having a partially spherical inner surface with a first radius;
- a ball located within the socket and having a partially spherical outer surface with a second radius smaller than the first radius;
- a first array of electromagnets mounted at the outer surface of the ball;
- a second array of electromagnets mounted at the inner surface of the socket; and
- means for supplying power selectively to different ones of the electromagnets of the two arrays to support the ball within the socket in a position where the partially spherical surfaces of the ball and socket are substantially concentric and to control the orientation of the ball relative to the socket.

BRIEF DESCRIPTION OF THE DRAWINGS

A preferred embodiment of the invention will now be described by way of example only with reference to the accompanying diagrammatic figures, in which.

DETAILED DESCRIPTION OF THE PREFERRED EMBODIMENT

The present invention is based on the general concept of forming a gimbal mounting for a sensor from an inner spherical ball and an outer spherical socket, the ball and socket being concentric and the ball being suspended and rotated within the socket by a plurality of electromagnets arranged on the opposed surfaces of the ball and socket.

Figure 1:
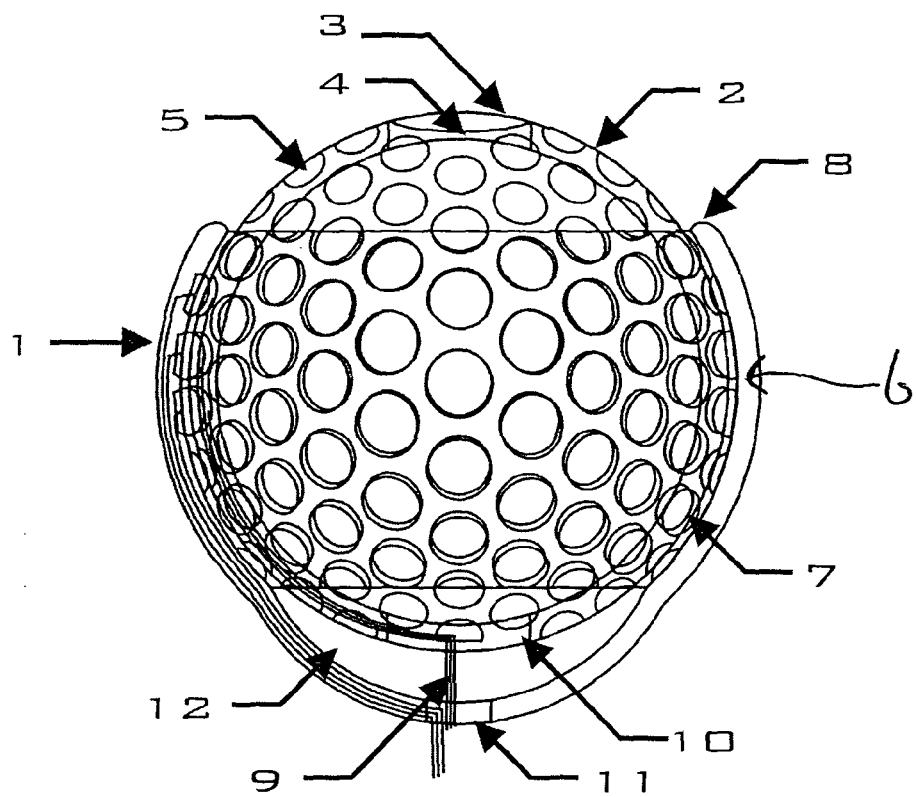
FIG. 1 shows a side view of a gimbal mounted camera according to a first embodiment of the invention.
Figure 2:
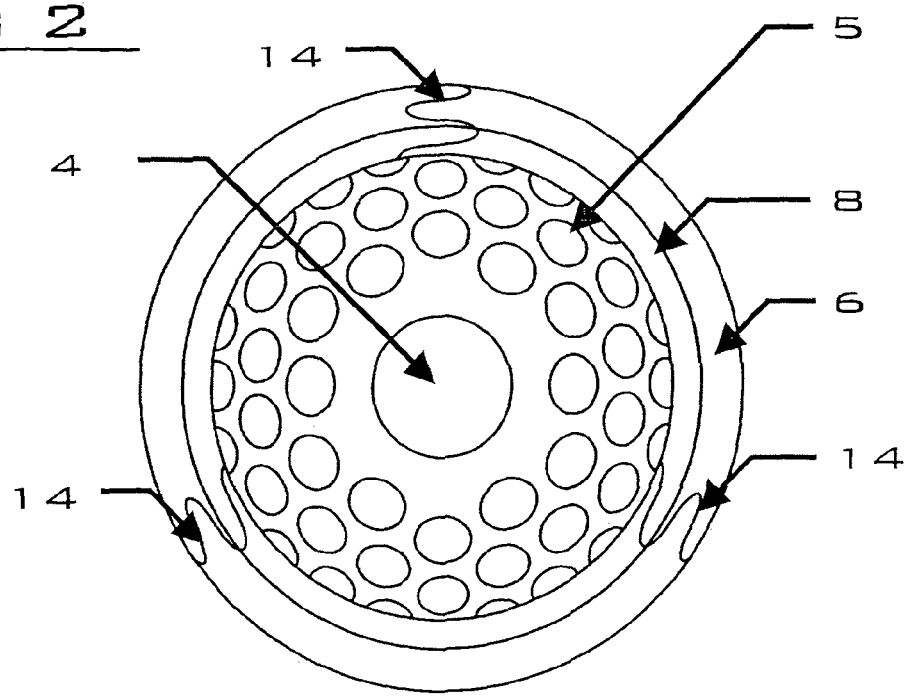
FIG. 2 shows a front view of the gimbal mounted camera of FIG. 1.

One example of a gimbal mounted video camera assembly 1 according to a first embodiment of the present invention and allowing three axis rotation is shown in FIGS. 1 to 4. FIG. 1 shows a side view of the camera assembly 1 and FIG. 2 shows a front view.

The camera assembly 1 comprises an inner hollow spherical ball 2 with an internal cavity 3 housing a video camera. The video camera has a field of view out of a first forward, aperture 4 in the ball 2. The ball 2 is mounted within a part spherical socket 6 having an inner surface concentric with the ball 2 and a first, forward, aperture 8 defining the limits of the field of view of the video camera.

The outer surface of the ball 2 is substantially covered by a first array of electromagnets 5 and the inner surface of the socket 6 is covered by a second array of electromagnets 7. The electromagnets 5 and 7 are located at, or near to, the respective surfaces of the ball 2 and socket 6 in order to minimise the separation between the electromagnets 5 and 7 of the two arrays and so maximise the strength of their interaction. The precise location of the electromagnets 5 and 7 relative to the respective surfaces of the ball 2 and socket 6 is not critical to the invention. The electromagnets 5 and 7 may be arranged on the respective surfaces, flush with the surfaces or below the surfaces as desired, for example in order to protect the electromagnets or to allow for convenient manufacture.

The ball 2 and socket 6 can be made from any suitable material, for example metal, ceramics or a plastics material. The fabrication methods used to form the ball 2 and socket 6 will depend in part on the chosen materials, but examples of possible techniques are milling, casting and moulding. In order to simplify manufacture of the assembly it will usually be preferred to form each of the ball 2 and the socket 6 in several sections which are secured together during manufacture.

In use the ball 2 is held suspended or levitated within the socket 6 by mutual magnetic repulsion between the electromagnets 5 and 7 of the first and second arrays. This supporting of the ball 2 by magnetic repulsion without physical contact between the ball 2 and socket 6 eliminates friction between the ball 2 and socket and allows smooth and highly controllable movement of ball 2.

The angular movement or orientation of the ball 2 within the socket 6 is changed and controlled by separately controlling the strength and polarity of the magnetic fields emitted by different ones of the electromagnets 5 and 7. In the disclosed embodiment the strength and polarity of the magnetic fields emitted by diametrically opposed electromagnets 5 and 7 of each of the first and second arrays are controlled to be the same. This "mirroring" of the electromagnets 5 and 7 on opposite sides of the apparatus 1 is preferred to ensure that the levitation of the ball 2 is not impaired by the changes in the strength and polarity of the magnetic fields emitted by different ones of the electromagnets 5 and 7 used to control the orientation of the ball 2 and help to keep the movement of the ball 2 smooth and predictable. However, this is not essential.

Preferably the outer surface of the socket 6 and the inner surface of the ball 2 are covered by an electromagnetic shielding material, or an EM shielding composite structure made up of a number of layers of different material. This EM shielding will prevent the electromagnetic signals emitted by the electromagnets 5 and 7 escaping from the assembly and acting as a source of electromagnetic signals or interference, or affecting the operation of the video camera. Further, EM shielding will prevent operation of the assembly being affected by external sources of EM interference.

In the illustrated embodiment each of the arrays of electromagnets 5 and 7 is a regular array in which each electromagnet is surrounded by six evenly spaced and equidistant electromagnets. This is expected to be a particularly useful arrangement. However, other arrangements of the arrays of electromagnets 5 and 7 could be used.

Although not essential, arranging the electromagnets 5 and 7 of the arrays in regular symmetric patterns and using the same pattern for both of the arrays is preferred. This will simplify control of movement of the ball 2.

In FIG. 1, the ball 2 is shown in a position where the electromagnets 5 and 7 of the first and second array overlay one another. It will be understood that for geometrical reasons, in order for the electromagnets 5 and 7 of the first and second arrays to overlay one another is necessary that the electromagnets 5 and 7 of the first and second arrays are arranged in the same pattern and also that the spacing of the electromagnets 5 and 7 in the first and second arrays are slightly different. The separation between the electromagnets 5 of the second array on the surface of the socket 6 is larger than the separation between the electromagnets 5 of the first array on the surface of the ball 2 so that corresponding electromagnets 5 and 7 of the first and second arrays have the same radial position relative to the centre about which the ball 2 and the socket 6 are concentric.

Although the spherical ball 2 and part spherical socket 6 are described as being concentric above, they will only be concentric when the ball 2 is held suspended within the socket 6 by magnetic repulsion. In order to allow movement of the ball 2 within the socket 6 it is necessary to have at least a small annular gap between the outer surface of the ball 2 and the inner surface of the socket 6. As a result, when the electromagnets 5 and 7 are not powered the ball 2 will rest in contact with the bottom surface of the socket 6 and the ball 2 and socket 6 will not then be exactly concentric.

In order prevent damage to the electromagnets 5 and 7 if the opposed surfaces of the ball 2 and socket 6 come into contact, for example when the electromagnets 5 and 7 are not powered and the weight of the ball 2 is supported by the surface of the socket 6, or in the event that the camera assembly 1 is subject to sufficient acceleration to overcome the magnetic repulsive forces and bring the ball 2 into contact with the surface of the socket 6, it is preferred that the outer surface of the ball 2 and inner surface of the socket 6 are smooth, and in particular that the electromagnets 5 and 7 do not project from the surfaces of the ball 2 and socket 6. Further, the opposed surfaces of the ball 2 and socket 6 may be lubricated by one or both surfaces being formed from a self lubricating material or having a lubricating coating.

In the illustrated embodiments the electromagnets 5 and 7 are embedded in the outer surface of the ball 2 and inner surface of the socket 6 respectively so that the opposed faces of the electromagnets 5 and 7 are flush with the respective surfaces of the ball 2 and socket 6. This arrangement is preferred in order to minimise the separation between the electromagnets 5 and 7 of the first and second arrays. Magnetic forces diminish with distance so that minimising this separation will minimise the size and power consumption of the electromagnets 5 and 7. However, in some applications it may be preferred to have the electromagnets 5 and 7 embedded within the surfaces of the ball 2 and socket 6 so that the opposed surfaces of the electromagnets 5 and 7 are covered by a thin surface layer. This arrangement may be desirable in order to protect the electromagnets 5 and 7 from environmental damage.

The outer diameter of the ball 2 is larger than the first aperture 8 in the socket 6 so that the ball 2 cannot be accidentally released from the socket 6 under any circumstances. In order to allow the camera assembly 1 to be assembled the socket is formed in three sections which are assembled around the ball 2. The joint seams 14 between the sections of the socket 6 are shown in FIG. 2.

In operation, a control system, not shown individually controls the amount of power supplied to each electromagnet 5 and 7 to control movement of the ball 2 within the socket 6. In order to supply power from the control system to the electromagnets 5 of the first array, and also to allow signals from the video camera to be sent for processing, a power and data cable 9 passes from the ball 2 and through the socket 4 for connection to an external power, control and signal processing system, which is not shown in figures for clarity.

The cable 9 is connected within the ball 2 to the video camera and to the individual electromagnets 5, although details of the connections within the ball 2 are not shown. The cable 9 passes through a second, rearward, aperture 10 in the ball 2, and through a second rearward aperture 11 in the socket 6. The range of possible movement of the ball 2 within the socket 6 is ultimately limited by the sizes of the holes 10 and 11 and the length of the cable 9. This degree of physical movement of the ball 2 to the socket 6 is not directly linked to or automatically the same as the limit of the field of view of the video camera set by the size of the first forward aperture 8 in the socket 6. However, it will usually be preferred to design the apparatus so that the available range of movement of the ball 2 substantially corresponds to the available field of view.

In order to provide space for the cable 9 to pass between the outer surface of the ball 2 and the inner surface of the socket 6 as the ball 2 rotates relative to the socket 6, the rear section of the socket 6 around the second aperture 11 is bulged outwardly to provide a cable space 12. The inner surface of the socket 6 in this bulged region does not include any electromagnets 7. As shown in the cross section of FIG. 3, in order to limit rotation of the ball 2 relative to socket 6 a circular stop 13 is provided on the surface of the ball 2 around the second aperture 10. The stop 13 extends radially outward from the surface of the ball 2 so that rotation of the ball 2 within the socket 6 will bring the stop 13 into contact with the edge of the bulged section of the socket 6 and so prevent further rotation of the ball 2 relative to the socket 6. Conveniently the stop 13 can be formed as a raised lip extending around the edge of the second aperture 10 in the ball 2.

The stop 13 is arranged to engage the inner surface of the socket 6 and prevent rotation of the ball 2 before the point at which rotation of the ball 2 would otherwise be prevented by the cable 9. That is, the stop 13 prevents the ball 2 rotating sufficiently to pull the cable 9 taut. Thus, the stop 13 prevents damage to the cable 9 or associated connections and components due to excessive rotation of the ball 2 within the socket 6. The control system will usually be arranged not to allow controlled movement of the ball 2 sufficient to damage the cable 9 or any another part of the assembly 1. However, it is possible that uncontrolled or uncommanded movement of the ball 2 sufficient to cause damage could take place, for example, if the support structure to which the socket 6 is attached under goes a sudden rotation or if the exposed surface of the ball 2 is contacted by an external body. The stop 13 prevents any such uncommanded or unintended movement damaging the camera assembly 1.

The stop 13 will not limit rotation of the ball 2 about the axis of the first and second apertures 8 and 11. In order to allow for such rotation the cable 9 should be connected at one end through a rotary connector. Alternatively, a further stop could be provided to limit rotation about this axis.

In the figures the first and second apertures 4 and 10 in the ball are close to the same size. This is not essential. It is preferred for the ball 2 to be manufactured as a number of sections so that any components inside the cavity 3 can be assembled and connected before the sections are joined together. As a result, the aperture 10 is not required to provide access to the cavity 5 during manufacture and only needs to be large enough for passage of the cable 9.

In the illustrated embodiments the first aperture 8 in the front of the socket 6 and the bulged section at the rear of the socket 6 providing the cable space 12 are diametrically opposed and have approximately the same area. The resulting symmetry of the first and second arrays of electromagnets 5 and 7 simplifies control of the device.

Preferably, the apparatus should be arranged so that the physical limit on movement of the ball 2 and socket 6 is slightly larger than required for the entire field of view available to the camera and the control system controlling movement of the ball 2 relative to the socket 6 should be arranged so that the maximum controlled range of movement of the ball 2 relative to the socket 6 corresponds to the limits of the field of view. This will make sure that there is a safety margin so that any unintended further movement of the ball 2 relative to the socket 6, will not cause the ball 2 to reach the physical limits of its movement.

In the illustrated embodiment the second aperture 10 in the ball 2 is diametrically opposite the first aperture 4 and is essentially the same size so that the aperture 10 is much larger than is required for passage of the cable 9. This size and location of the second aperture 10 is not essential but is convenient to allow easy assembly of the video camera and other electronic components inside the ball 2.

In order to allow the rotation of the ball 2 to be controlled the strength and polarity of the magnetic field generated by each of the electromagnets 5 and 7 of each array can be individually controlled. In order to rotate the ball 2, the magnetic fields of opposed or adjacent electromagnets 5 and 7 of the two different arrays are adjusted to generate a couple about the desired axis of rotation between the ball 2 and the socket 6. When the ball 2 reaches the desired position relative to the socket 6, the magnetic fields of the electromagnets 5 and 7 are adjusted to hold the ball 2 in position without applying any couple.

Figure 3:
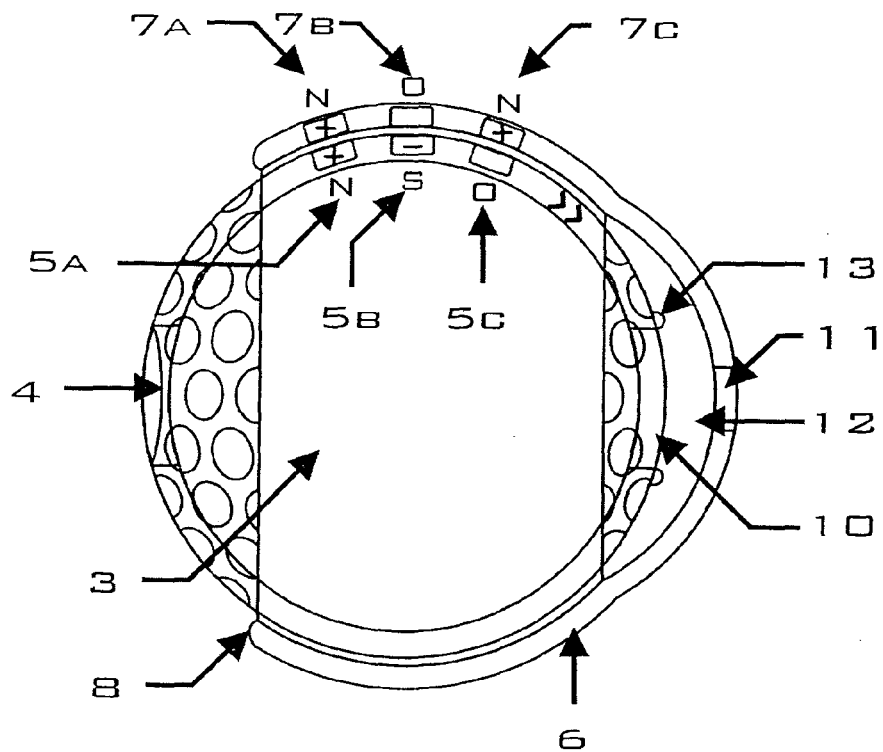
FIG. 3 shows a cross sectional view of the gimbal mounted camera of FIG. 1.

An example of the magnetic forces generated by the power supplied from the control system to adjacent electromagnets 5 and 7 of the first and second arrays to carry out controlled rotation of the ball 2 within the socket 6 is shown in FIG. 3.

FIG. 3 shows a cross section through the camera apparatus 1 shown in FIG. 1 along a plane through the centres of both the first and second apertures 3 and 10 of the ball 2. For convenience apparatus 1 is shown with the ball 2 in at foresight position where the first aperture 3 of the ball is in the centre of the first aperture 8 in the socket.

In FIG. 3 three adjacent opposed pairs of electromagnets 5a and 7a, 5b and 7b and 5c and 7c are shown. The electromagnets 7a to 7c and 5a to 5c are shown in FIG. 3 generating magnetic fields which will cause the ball 2 to rotate relative to the socket 6 in a clockwise direction about an axis perpendicular to the plane of the paper. In order to do this the magnets 5a and 7a generate magnetic fields of the same polarity, in this case, north fields (N). For clarity only electromagnets on one side of the apparatus 1 are shown, however as explained above, the same magnetic fields would be generated by the diametrically opposed electromagnet in each of the first and second arrays.

Electromagnet 5b generates the opposite, south (S), magnetic field while the opposed electromagnet 7b is not powered and generates no magnetic field (O). Electromagnet 5c is also not powered and generates no magnetic field (O) while the opposed magnet 7c produces a magnetic field of north polarity (N). As a result of these different magnetic polarities the net attractive force between the electromagnets 5b and 7c of opposite polarities generates a couple which rotates the ball 2 in a clockwise direction.

This is only one example of a pattern of magnetic polarities of adjacent electromagnets which can be used to rotate the ball 2 within the socket 6, there are many other possible patterns. In particular, there is no significance in the selection of a north magnetic field for the mutually repulsive electromagnets 5a and 7a. The technically significant feature is the relative polarity, that is whether the different electromagnets are of the same polarity, and so repulsive, or of opposite polarity, and so attractive, or are de-powered generating no magnetic field, the absolute polarity is of no significance and could be reversed.

In FIG. 3 only the electromagnets on one side of the apparatus 1 are shown. It is preferred to achieve controlled rotation of ball 2 within the socket 6 by applying the same pattern of magnetic forces to the diametrically opposed electromagnets so that the forces on the ball 2 are mirrored. Such a mirroring of the magnetic forces applied through the electromagnets 5 and 7 is a simple method of ensuring that there is no net linear force acting on the ball 2 but only a couple so that the ball 2 remains concentric with the socket 6.

As explained above, the power supplied to each of the electromagnets 5 and 7 of the first and second arrays can be individually controlled so that the magnetic fields that they generate can be individually controlled. By appropriate control of the magnetic fields generated by the electromagnets 5 and 7 of the first and second arrays the ball 2 can be simultaneously held concentrically with the socket 6 and rotated as desired about any axis by any desired amount.

In order to stabilise the ball 2 within the socket 6 localised groups of electromagnets 5 and 7 can be arranged to generate a localised attractive force, for example between one electromagnet in each array in order to resist or prevent relative rotation of the ball 2 within the socket 6. There is only an attractive force in a localised position so that the ball 2 is still held concentrically within the socket 6 by mutual repulsion between other electromagnets 5 and 7 of the two arrays so that magnetic levitation of the ball 2 within the socket 6 continues.

Figure 4:
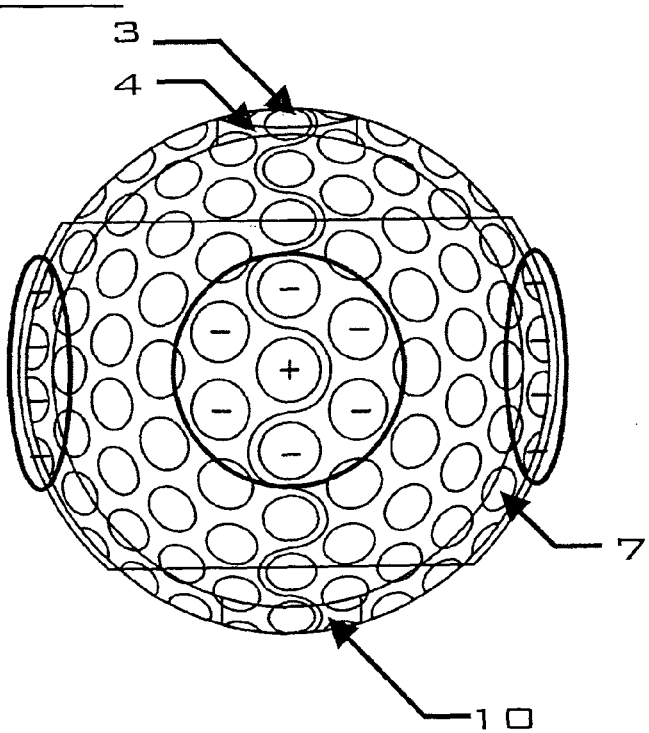
FIG. 4 shows an example of magnetic force patterns used in the gimbal mounted camera of FIG. 1.

FIG. 4 shows one example of such an arrangement of a localised magnetic attraction (indicated by a +) between one pair of opposed electromagnets 5 and 7 while repulsions (indicated by a −) are maintained between the adjacent pairs of opposed electromagnets 5 and 7 so that an overall net repulsion between the ball 2 and socket 6 is maintained.

In FIG. 4, four such localised attractions are arranged symmetrically around the assembly 1 to hold the ball 2 in position within the socket 6, and three of these are visible in the figure.

Where the ball 2 is being rotated within the socket 6 by generating a couple around the axis, in addition to the mirroring discussed above with a reference to FIG. 3, the electromagnets 5 and 7 can be controlled to further stabilise the ball 2 against linear movement relative to the socket 6 by also generating localised attractions or repulsions at diametrically opposed positions lying on the axis of the intended rotation and which resist movement of the ball 2 about any other axis.

In general it will be relatively complex to calculate the necessary sequence of power and polarity of magnetic fields required to be generated by the different electromagnets to execute a desired rotation of the ball 2 within the socket 6. Accordingly, it is expected that the control system of the assembly will comprise a computer. That is, an operator will instruct the control system what rotational movement of the ball 2 is required and a computer forming part of the control system will then calculate and supply or instruct the necessary powers to the different electromagnets.

The fineness or accuracy of the degree of control of the rotational orientation and movement of the ball 2 within the socket 6 depends in general on the number of electromagnets 5 and 7 in each array, with more electromagnets giving more accurate control. In fact, in the illustrated embodiment, the accuracy depends on the number of electromagnets 7 in the second array on the socket 6. The additional electromagnets 5 of the first array on the ball 2 which are not opposed to electromagnets 7 in the second array on the socket 6 do not contribute to improved accuracy.

As a result, in many applications the number of electromagnets in each array will decided by the required accuracy of control of the ball 2 and will be higher, and in many cases much higher, than the number of electromagnets required to support the ball 2 within the socket 6. Accordingly, in operation it may often be the case that some, or even a majority, of the electromagnets are not powered at any particular time.

Where only some, and not all, of the electromagnets are required to support the ball 2, in order to simplify the control arrangements and calculations it may be advantageous to separate the support and movement functions of the electromagnets. That is, some suitably located groups of electromagnets can be selected to control the movement of the ball 2 while others generate only the supporting repulsive forces.

One possible difficulty which could arise is that because it is preferred that the first and second arrays of electromagnets should have regular patterns, where no power has been applied to the electromagnets for a time, it may not be possible to confirm the orientation of the ball 2 relative to the socket when the power supply is started. In order to overcome this problem a special switch on power sequence to be supplied to predetermined ones of the electromagnets could be used which will bring the ball 2 into a known orientation. Alternative approaches are also possible, for example power could be supplied too only one electromagnet in one array and the electromagnets of the other array used to detect the relative position of this powered electromagnet.

As explained above, the cable 9 carries power and control signals to the electromagnets 5 on the ball 2. These can either be provided as a separate power connection to each electromagnet 5 or a power connection and data connection to a switching unit within the ball 2, with the data provided through the data connection instructing the switching unit what power should be switched to each of the electromagnets 5.

In the first embodiment, the apertures 4, 8, 10 and 11 are shown as open, for simplicity. However, in practice this will leave the gimbal assembly and the video camera vulnerable to physical and environmental damage.

Figure 5:
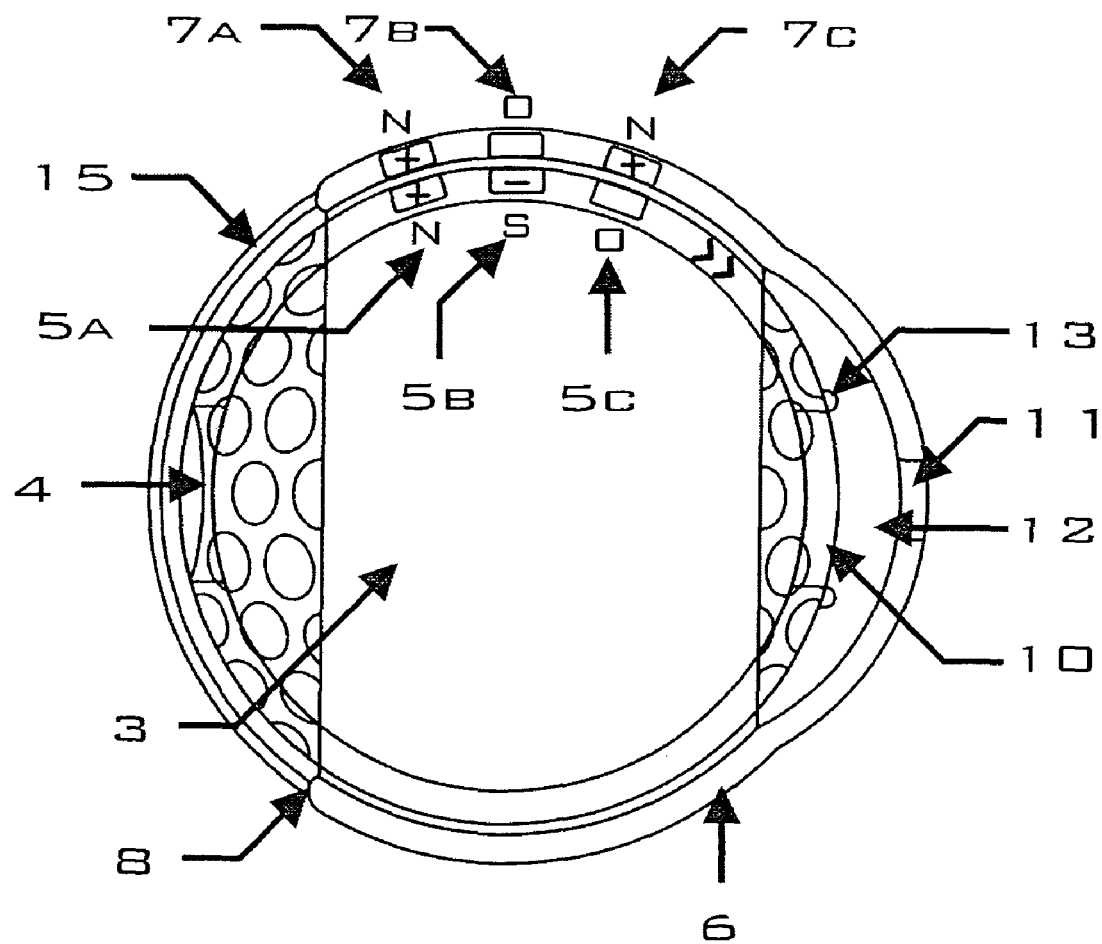
FIG. 5 shows a side view of a gimbal mounted camera according to a second embodiment of the invention.

In a second embodiment shown in FIG. 5, the front aperture 8 in the socket 6 is sealed by a part-spherical transparent cover 15. The transparent cover 15 protects the ball 2, the video camera and the interior of the socket 6 from being physically contacted. This protects the ball 2 and video camera from direct physical harm and also prevents harm to the camera assembly as a whole, for example by the ball 2 being forced into contact with the socket 6 or by foreign objects becoming trapped between the opposed surfaces of the ball 2 and socket 6.

Further, if the aperture 11 is also sealed, the camera assembly 1 as a whole can be sealed, so preventing environmental damage, such as corrosion due to condensation forming inside the assembly.

In both the first and second embodiments, the aperture 4 in the ball 2 may optionally be sealed by a suitable transparent layer to protect the video camera.

In the described embodiments the space between the ball 2 and the socket 6 is shown as empty. Generally this gap will contain air or, in the second embodiment, a selected gas mixture. This gap could alternatively contain a liquid to act as a lubricant and/or a cushioning layer between the ball 2 and socket 6. If the gap contains a liquid it will usually be necessary to provide a liquid retaining sliding seal at least around the perimeter of the aperture 8, unless the second embodiment having a transparent cover 15 is used and the liquid is transparent.

The illustrated embodiments described above employ a gimbal according to the invention to support and direct a camera. A similar arrangement can be used to support and direct other types of sensors or energy emitting devices. For example to support and direct a laser cutter for use in surgery. The gimbal can also be used as a multiple axis servo for moving or operating physical devices and end effectors, however this will usually be incompatible with the cover 15 of the second embodiment.

The present invention is not limited to the described embodiments. Alternative arrangements can be envisaged by the skilled person within the scope of the invention as defined in the attached claims.

The invention claimed is:

1. A gimbal arrangement comprising:
 a socket having a partially spherical inner surface with a first radius;
 a ball located within the socket and having a partially spherical outer surface with a second radius smaller than the first radius;
 a first array of electromagnets mounted at the outer surface of the ball;
 a second array of electromagnets mounted at the inner surface of the socket; and
 at least one power supply configured to selectively supply power to different ones of the electromagnets of the two arrays so as to hold the ball suspended relative to the socket by magnetic interaction between different electromagnets of the first and second arrays without applying any couple, the ball being held suspended within the socket by mutual magnetic repulsion between some electromagnets of the first and second arrays in a position where the partially spherical surfaces of the ball and socket are substantially concentric about a common center, said power supply also configured to control the orientation of the ball relative to the socket while being held suspended relative to the socket by magnetic interaction between different electromagnets of the first and second arrays by applying a couple.

2. The gimbal arrangement according to claim 1, in which each of the first and second arrays comprises a plurality of electromagnets arranged in a regular symmetric pattern.

3. The gimbal arrangement according to claim 2, in which the electromagnets of both of the first and second arrays are arranged in the same pattern.

4. The gimbal arrangement according to claim 3, in which the separation between the electromagnets of the second array is larger than the separation between the electromagnets of the first array so that pairs of electromagnets of the first and second arrays lie on common radii of the common centre.

5. The gimbal arrangement according to claim 1, in which the ball is hollow.

6. The gimbal arrangement according to claim 1, in which a camera is arranged inside the ball.

* * * * *